United States Patent [19]

Quilling, II

[11] Patent Number: 5,467,947
[45] Date of Patent: Nov. 21, 1995

[54] MOUNTING KIT FOR MOUNTING ONE OF SEVERAL TYPES OF AUDIO EQUIPMENT IN AN AUTOMOTIVE DASHBOARD

[75] Inventor: R. Spencer Quilling, II, DeLeon Springs, Fla.

[73] Assignee: Metra Electronics Corporation, Holly Hill, Fla.

[21] Appl. No.: 224,722

[22] Filed: Apr. 8, 1994

[51] Int. Cl.⁶ .................................................. G12B 9/00
[52] U.S. Cl. ........................................ 248/27.1; 248/558
[58] Field of Search .................................. 248/27.1, 27.3, 248/558, 221.3, 220.2, 221.4, 904; 312/7.1; 403/4; 455/345

[56] References Cited

U.S. PATENT DOCUMENTS

| | | | |
|---|---|---|---|
| 3,685,879 | 8/1972 | Tsuji | 248/27.3 X |
| 4,699,341 | 10/1987 | Ponticelli | 248/27.3 X |
| 4,738,420 | 4/1988 | Angle et al. | 312/7.1 X |
| 4,868,715 | 9/1989 | Putman et al. | 248/27.3 X |
| 5,106,039 | 4/1992 | Gross | 248/27.1 |
| 5,307,327 | 4/1994 | Green et al. | 248/27.1 X |

*Primary Examiner*—Karen J. Chotkowski
*Attorney, Agent, or Firm*—Fitzpatrick, Cella, Harper & Scinto

[57] ABSTRACT

A mounting kit for mounting one of various types of radios or the like to support brackets in a vehicle. The kit includes a radio housing, mounting brackets and shaft supports. The mounting brackets can be used with the radio housing to mount an ISO-DIN radio. The shaft supports can be used with the housing to mount a two-shaft radio. Only the radio housing need be used when installing a DIN radio with a DIN cage.

28 Claims, 4 Drawing Sheets

MOUNTING KIT FOR MOUNTING ONE OF SEVERAL TYPES OF AUDIO EQUIPMENT IN AN AUTOMOTIVE DASHBOARD

BACKGROUND OF THE INVENTION

1. Field of the Invention

The present invention is directed to a mounting assembly or kit for mounting an autosound unit, either of a two-shaft or ISO-DIN type, in various dashboards of a vehicle in order to provide quick and secure mounting construction, with a minimum use of tools. The mounting kit according to the present invention is significantly universal and can be adapted to a wide variety of audio equipment types as well as a wide variety of vehicle types and models.

2. Brief Description of Prior Art

Professional autosound installers and vehicle owners seek to securely install a wide variety of autosound electronic devices to a wide variety of vehicles. A large number of mounting kits have been designed to meet that need.

One mounting assembly is described in U.S. Pat. No. 4,784,357. In this apparatus, an inner case is fitted in an opening of a dashboard panel and the audio unit is inserted through an insertion hole of the inner case and attached with pin fitting portions and lock pin units. Each lock pin unit is attached to a side of the audio unit. However, the kit requires an excessive amount of hardware to mount the innercase and the lock pin unit. Further, a single kit cannot readily mount one of several types of radios.

U.S. Pat. Nos. 4,913,384 and 4,993,668 both disclose mounting structures for car-mount devices, in which a mounting tube having detent holes is inserted and fixed to the dashboard of a vehicle. Mounting pieces are then fixed to the sidewalls of the main body of the audio unit and the audio unit is inserted into the mounting tube. Each mounting piece has a detent pawl which engages with one of the detent holes to secure the unit in the tube. However, the mounting structure is for mounting a single type of unit having a front panel projecting from the main body with a step therebetween; it is not disclosed for mounting a plurality of types of radios or the like. Further, a bulky mounting tube must be used which increases the weight and cost of the kit.

U.S. Pat. Nos. 4,660,789 and 4,756,495 each disclose a conversion kit for mounting a radio to be substituted for an original radio in an automobile. The kit includes a mounting panel unit for receiving a frontwardly projecting portion of the radio. The panel unit includes slots for receiving locking clips. The mounted locking clips enable the radio to slide into retaining engagement with edge portions of an instrument panel. However, the radio is secured by the resiliency of the clips and can readily be removed with a sufficient amount of pressure. Further, the conversion kit is primarily for a radio having two control shafts and cannot readily accommodate other types of radios.

U.S. Pat. No. 5,228,652 describes a radio installation kit including a rectangular frame having two pairs of opposing runners. Panel members, having apertures through which radio control shafts can be fitted, slide along the edges of the runners to accommodate radios with different spacing between the control shafts. However, the kit cannot accommodate other types of radios that do not include control shafts.

U.S. Pat. No. 4,462,564 discloses a conversion kit for mounting a substitute radio in an automobile. The mounting kit includes a mounting frame having a front panel through which the radio is inserted. The radio is secured to the mounting frame by the front panel. Different front panels can be used in order to accommodate different radios or different types of units. However, the front panel is integral with the mounting frame; therefore, completely different mounting flames must be used when different front panels are needed.

U.S. Pat. No. 4,895,326 discloses an installation kit that will adapt to different radios and different dashboard configurations. The installation kit includes a box-like molded plastic frame including end walls and a main front panel. The end walls include recesses for accommodating attachment to different chassis 13 of aftermarket radios. The housing also includes plastic break-away walls with through-openings to accommodate control shafts of the radio. The walls can be discarded when a radio having a larger front wall, such as a DIN radio, is used. However, the end walls are permanently affixed to the housing, and therefore cannot be discarded even if they are not necessary for a particular type of radio. Further, there is no structure for supporting a DIN cage, when such a unit is to be installed.

Thus, there is a need in the art for a radio installation kit that can mount any of a wide variety of types of audio units, including two-shaft radios, ISO-DIN radios and DIN radios with DIN cages.

SUMMARY OF THE INVENTION

The present invention provides an installation kit for installing several types of radios into a vehicle dashboard. Throughout the specification the terms radio, audio unit and component are used interchangeably, but mean any type of component mountable in a vehicle, such as a stereo with a tuner, a CD player, cassette player, an amplifier or the like. The three main types of audio components are a DIN unit, which may include a DIN cage, an ISO-DIN unit and a two-shaft unit.

In its preferred embodiment, the invention comprises a radio housing as well as several auxiliary components to mount the selected radio unit type to the radio housing. The radio housing includes a main body having support flanges to be connected to support brackets in the vehicle dashboard, a main aperture through which the radio unit protrudes, and a plurality of legs extending rearwardly from the main body to define a space within which the radio unit rests. In mounting an ISO-DIN radio, side brackets are fixed to the legs of the radio housing in order to attach the radio unit with screws. When a two-shaft radio is to be installed, two snap-in shaft supports are snapped into the main aperture of the housing to accommodate the two control shafts of the radio. When a DIN radio including a DIN cage is to be installed, the DIN cage is inserted into and secured to the radio housing and the radio unit is slid into the cage until secure.

Although different housing designs may be required for different vehicle makes and models, the side brackets, shaft supports and trim rings are interchangeable. This results in fewer and less complex molds and thus minimizes manufacturing costs.

According to one aspect of the present invention a housing, which mounts one of a plurality of types of components to a support in a vehicle, includes a main body and a plurality of legs extending from the main body. The main body includes a main aperture through which the component protrudes. The plurality of legs extends from the main body and defines a space within which the component is housed.

Each leg is L-shaped in cross-section and corresponds to one side corner of the audio component.

According to a further aspect of the present invention a mounting kit, which mounts one of a plurality of types of components to a support in a vehicle, includes a component housing, at least one shaft support and at least one side bracket. The component housing houses a component and includes a main body having an aperture through which the component protrudes, a flange for securing the housing to the vehicle support and a plurality of legs defining a space within which the component is housed. The at least one shaft support has a shaft aperture therein and is attachable to the housing at a position where the shaft aperture will receive a control shaft of the component. The at least one side bracket is attachable adjacent a pair of the legs and secures the component to the housing.

According to yet another aspect of the present invention a mounting kit, which mounts a component to a support in a vehicle, includes a component housing and at least one side bracket. The component housing houses the component and includes a main body having an aperture through which the component protrudes, a flange for securing the housing to the vehicle support and a plurality of legs defining a space, within which the component is housed. The at least one side bracket is attachable to the housing to secure the component to the housing and is secured to at least one of the legs.

According to yet a further aspect of the present invention a mounting kit, which mounts a component, having at least one control shaft, to a support in a vehicle, includes a component housing and at least one shaft support. The component housing houses the component and includes a main body having an aperture through which the component protrudes, a flange for securing the housing to the vehicle support, and a plurality of legs defining a space, within which the component is housed. The plurality of legs are L-shaped in cross-section and each of the plurality of legs corresponds to one side corner of the component. The at least one shaft support has a shaft aperture for supporting the at least one control shaft of the component. The at least one shaft support attaches to the periphery of the aperture of the main body of the housing.

These and other objects and advantages of the invention, as well as details of an illustrative embodiment, will be more fully understood from the following specification and drawings.

DESCRIPTION OF THE PREFERRED EMBODIMENT

The present invention features a radio installation kit having a radio housing and several auxiliary components for mounting one of several types of radios. When mounting a DIN radio with a DIN cage, only the radio housing of the installation kit is needed. When mounting an ISO-DIN radio, two ISO-DIN side brackets are affixed to the sides of the housing and a trim ring is snapped into a main aperture of the housing. When mounting a two-shaft radio, snap-in shaft supports are snapped into the main aperture of the housing to support the two control shafts of the radio.

The installation kit of the present invention provides all of the necessary auxiliary components and any one of various types of radios can be installed using a single kit. It can be appreciated that since the mounting kit according to the present invention essentially comprises only matable plastic pieces, manufacturing and production are greatly simplified, and the installation process itself is quite convenient for persons of even limited skill. Further, since only auxiliary components that are needed to install a particular type of radio are used, the unneeded auxiliary components can be discarded, thus reducing the size and weight of the kit.

Figure 1:
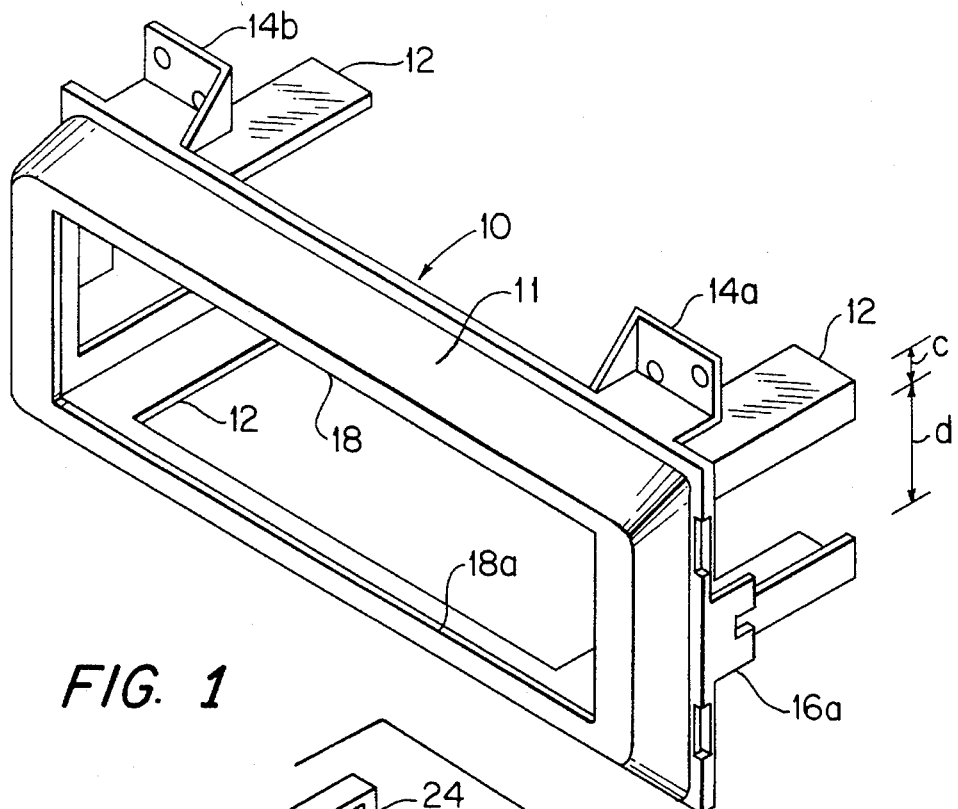
FIG. 1 is a perspective view of the radio housing according to the present invention.

FIG. 1 is a perspective view showing the housing of the present invention. The housing 10 is formed of an integral piece of molded plastic, for example, and includes a main body 11 and four legs 12 protruding from the rear of the main body. The legs 12 are L-shaped in cross-section and define four corners of a space into which the radio unit will fit. The legs can also support one or more corner edges of the audio unit. The distance between parallel, facing sides of the upper and lower legs 12 is sized to closely accommodate the height of a DIN radio. The distance between parallel, facing sides of right and left legs 12 is sized to accommodate the width of a DIN automobile radio. The housing 10 includes right and left mounting flanges 14a, 14b formed integrally with the main body 11 for securing the housing 10 to vehicle supports in the vehicle dashboard with screws, bolts or the like. The body 11 of housing 10 also includes integrally formed right and left lower mounting flanges 16a and 16b for mounting the housing to lower brackets, for example, mounting brackets on a pocket assembly of a vehicle. The left lower mounting flange 16b is not shown in the Figure.

The radio housing 10 further includes a main aperture 18 through which a front face of the radio unit can protrude. The aperture 18 includes a recessed inner peripheral edge 18a. The upper surface of the inner periphery of edge 18a is co-planar with the horizontal components of the upper legs 12, the side walls of the inner periphery of edge 18 are co-planar with the vertical components of each of the four legs 12, and the lower surface of the inner periphery of edge 18a is co-planar with the horizontal components of the lower legs 12.

Figure 2:
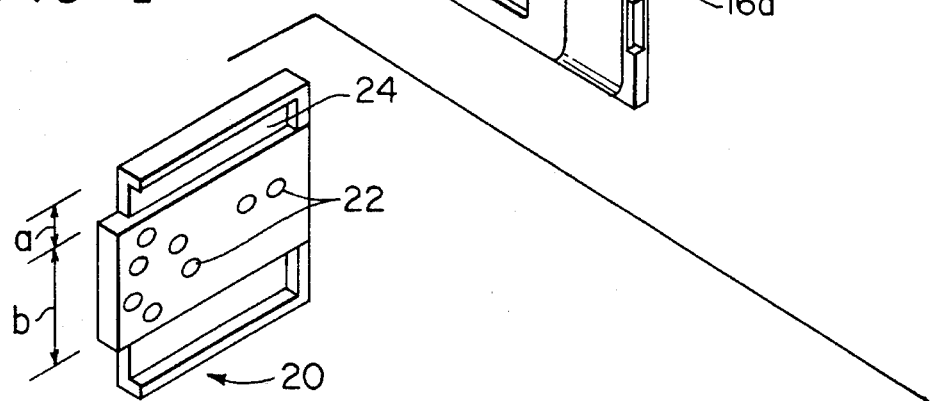
FIG. 2 is a perspective view of two side brackets of the present invention.
Figure 5:
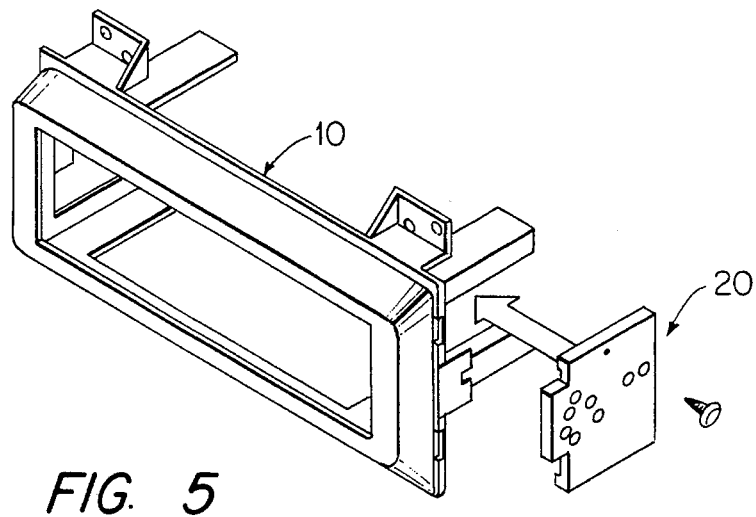
FIG. 5 is a perspective view of one side bracket being secured to the radio housing.

FIG. 2 is a perspective view showing right and left mounting brackets 20 for mounting an ISO-DIN radio in a dashboard. Each bracket includes a plurality of counter-sunk through-holes 22 for accommodating pan-head screws to be inserted in complementary screw holes in the radio unit. The pattern of the through-holes 22 is identical to the pattern of the radio unit, which is standard in the industry. Each bracket is preferably formed of an integral piece of molded plastic and includes two recessed portions 24. The height a of each recessed portion 24 is substantially equal to the height c of the vertical component of each leg 12 of the housing 10. Similarly, the distance b between two recessed portions 24 is substantially equal to the distance d between the vertical components of two legs 12 of the housing 10. Accordingly, each bracket 20 can be press-fitted or snapped over two legs on one side of the radio housing as shown in FIG. 5. Each bracket further includes a through-hole 26 to permit passage of a self-tapping screw, as shown in FIG. 5, to secure the bracket to the housing.

Figure 3:
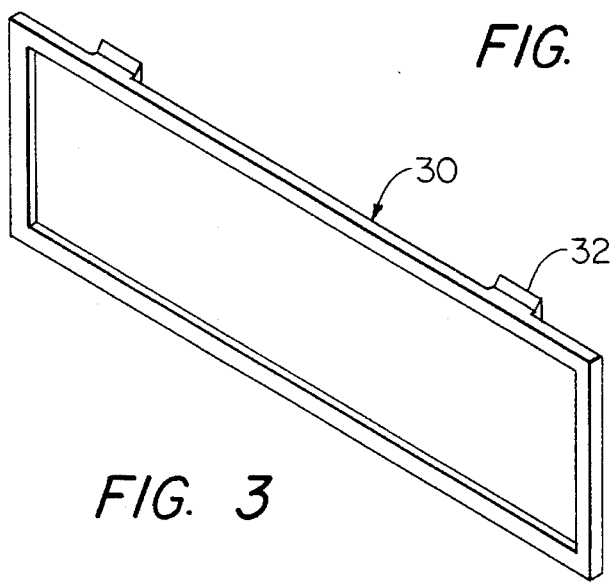
FIG. 3 is a perspective view of a trim ring according to the present invention.

FIG. 3 is a perspective view showing ISO-DIN trim ring 30. The trim ring 30 includes a plurality of detents 32 so that the trim ring can be snapped into the inner periphery of the main aperture 18 of the main body of the housing and rest on the peripheral edge 18a of the housing so as to be flush with the external surface of the housing. The trim ring 30 is dimensioned so as to allow the front face of an ISO-DIN radio unit to protrude externally of the trim ring, but prevent the body of the radio unit from protruding externally of the trim ring. The trim ring is preferably formed of an integral piece of plastic.

Figure 4:
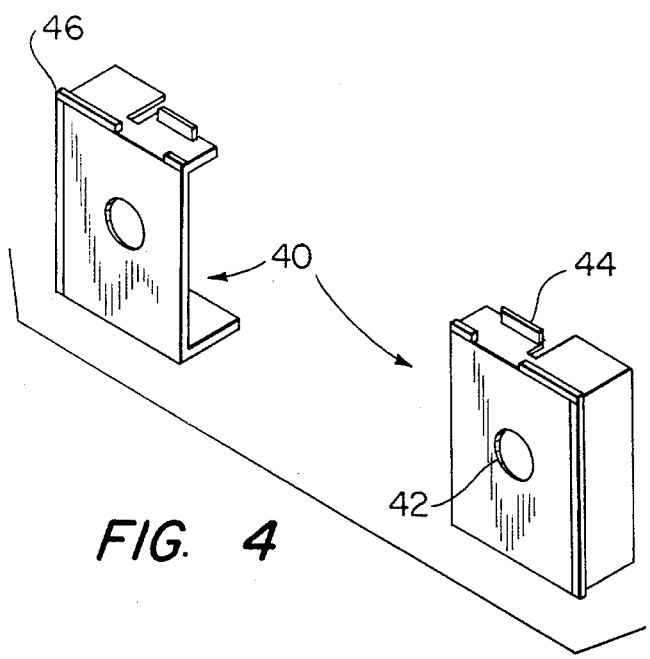
FIG. 4 is a perspective view of two snap-in shaft supports according to the present invention.

FIG. 4 is a perspective view of right and left snap-in shaft supports 40. Each shaft support 40 includes a center shaft aperture 42 for accommodating a control shaft of a two-shaft radio unit. Each shaft support includes a pair of detents 44 for snapping into either side of the main aperture 18 of the radio housing 10. Each shaft support includes an outer edge 46 for resting on the inner peripheral edge 18a of the main aperture 18 of the radio housing 10. When the shaft support is snapped into the main aperture 18, the edge 46 rests on the inner peripheral edge 18a such that the surface of the shaft support is flush with the outer surface of the housing 10. Each shaft support 40 is preferably formed of an integral piece of plastic.

The housing 10 and all of the above-described auxiliary components, as well as the required hardware, are included in the installation kit. The installer then utilizes the necessary components depending on the type of audio unit to be installed.

Figure 6:
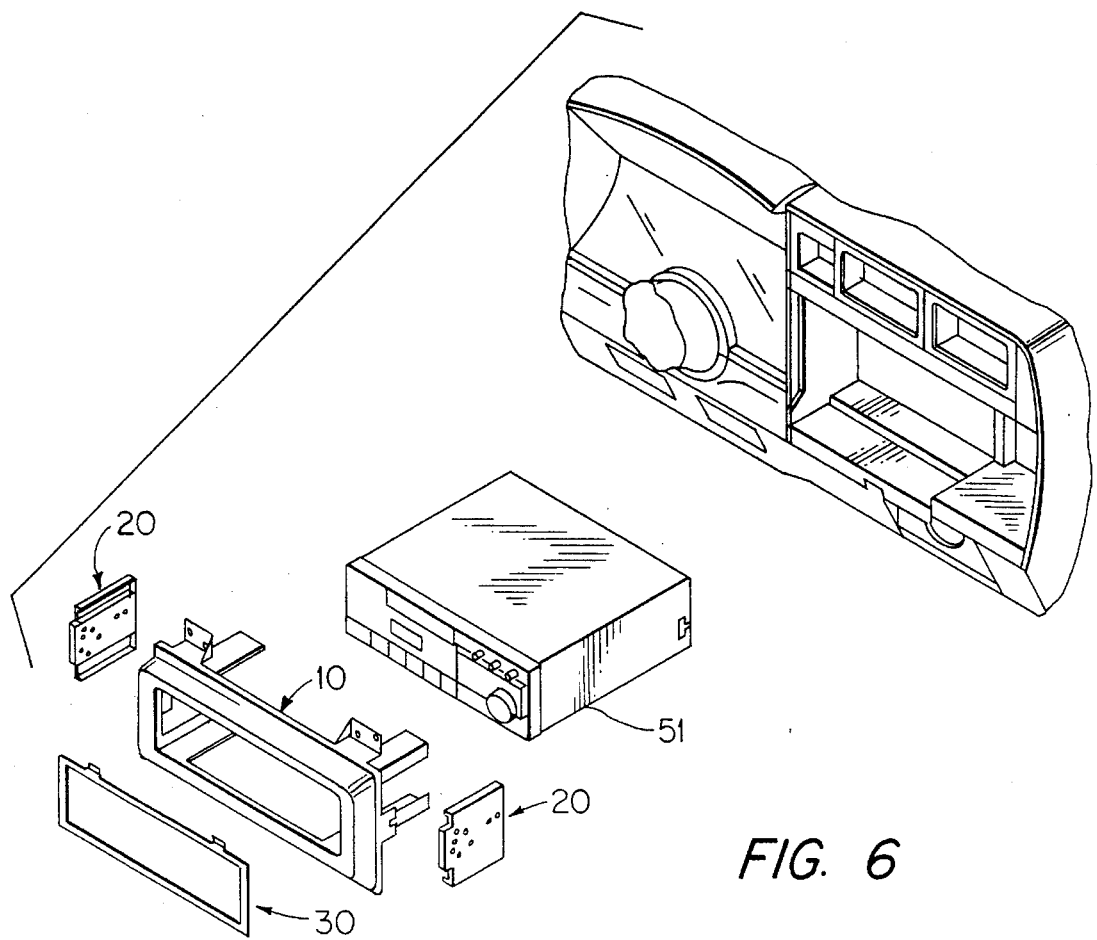
FIG. 6 is an exploded perspective view of a mounting kit of the present invention installing an ISO-DIN radio in a vehicle dashboard.

Installation of an ISO-DIN radio will be described with reference to FIGS. 5 and 6. Initially, the ISO-DIN trim ring 30 is snapped into the main aperture 18 of the radio housing 10 so that it is flush with the outer surface of the housing 10. Then, the right and left ISO-DIN brackets are snapped onto the legs 12 of the housing 10 and secured to the legs with self-tapping screws as shown in FIG. 5.

The ISO-DIN radio unit 51 is then inserted into the housing and secured with several pan-head screws. The radio unit 51 and housing 10 are then secured to the dashboard supports with bolts or screws inserted through the slots or holes of flanges 14a, 14b, 16a and 16b. If the radio is to be affixed to another component of the vehicle, such as a pocket assembly, the brackets of the pocket assembly can be connected to lower flanges 16a, 16b prior to connection to the dash. The snap-in shaft supports are not needed and therefore may be discarded.

Figure 7:
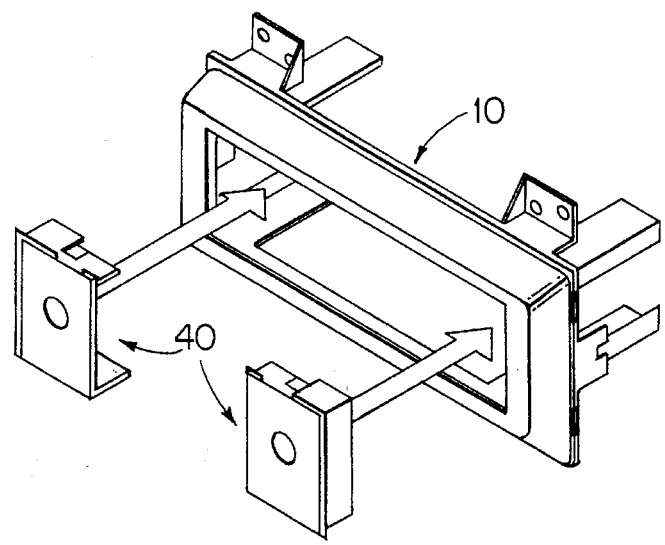
FIG. 7 is a perspective view of two snap-in shaft supports being inserted into the radio housing of the present invention.
Figure 8:
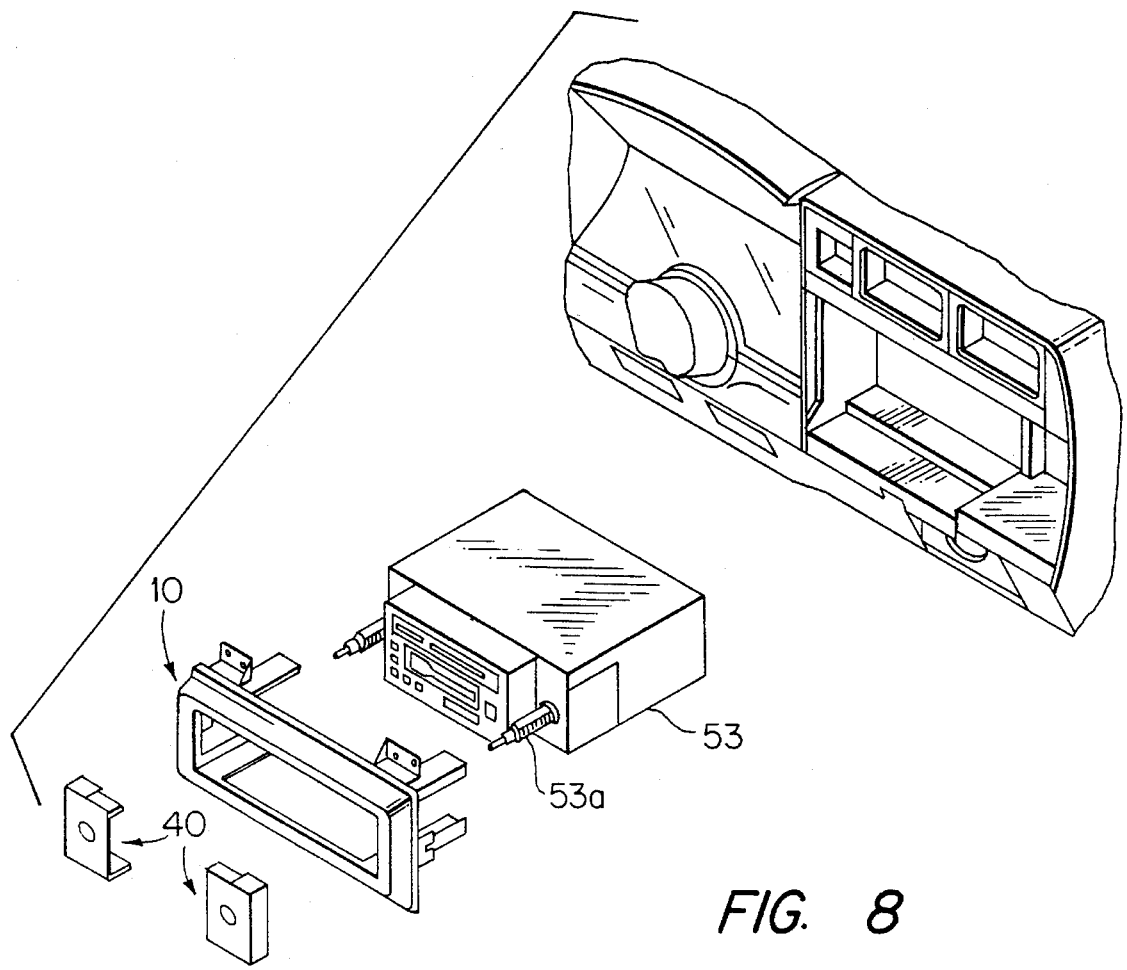
FIG. 8 is a perspective view of the installation kit of the present invention installing a two-shaft radio in a dashboard of a vehicle.

Installation of a two-shaft radio will be described with reference to FIGS. 7 and 8. Initially, snap-in shaft supports 40 are snapped into the right and left sides of the radio housing as shown in FIG. 7. The detents 44 of the supports grip the inner surface of the inner peripheral edge 18a of the housing. The outer surface of the supports are then flush with the external surface of the housing 10.

The two-shaft radio 53 is then inserted into the housing. The four side corners of the radio are housed within the area defined by the L-shaped inner peripheries of the four legs 12 of the housing. Each of the two control shafts 53a of the radio unit is guided through shaft aperture 42 of a shaft support 40. The radio 53 is then secured to the housing by tightening shaft nuts on a threaded portion of each control shaft until the nut tightly abuts the surface of the shaft support. The housing with the mounted two-shaft radio is then secured to the dash using flanges 14a, 14b, 16a, 16b as with an ISO-DIN radio. The ISO-DIN brackets and the ISO-DIN trim ring are not necessary and therefore may be discarded.

Figure 9:
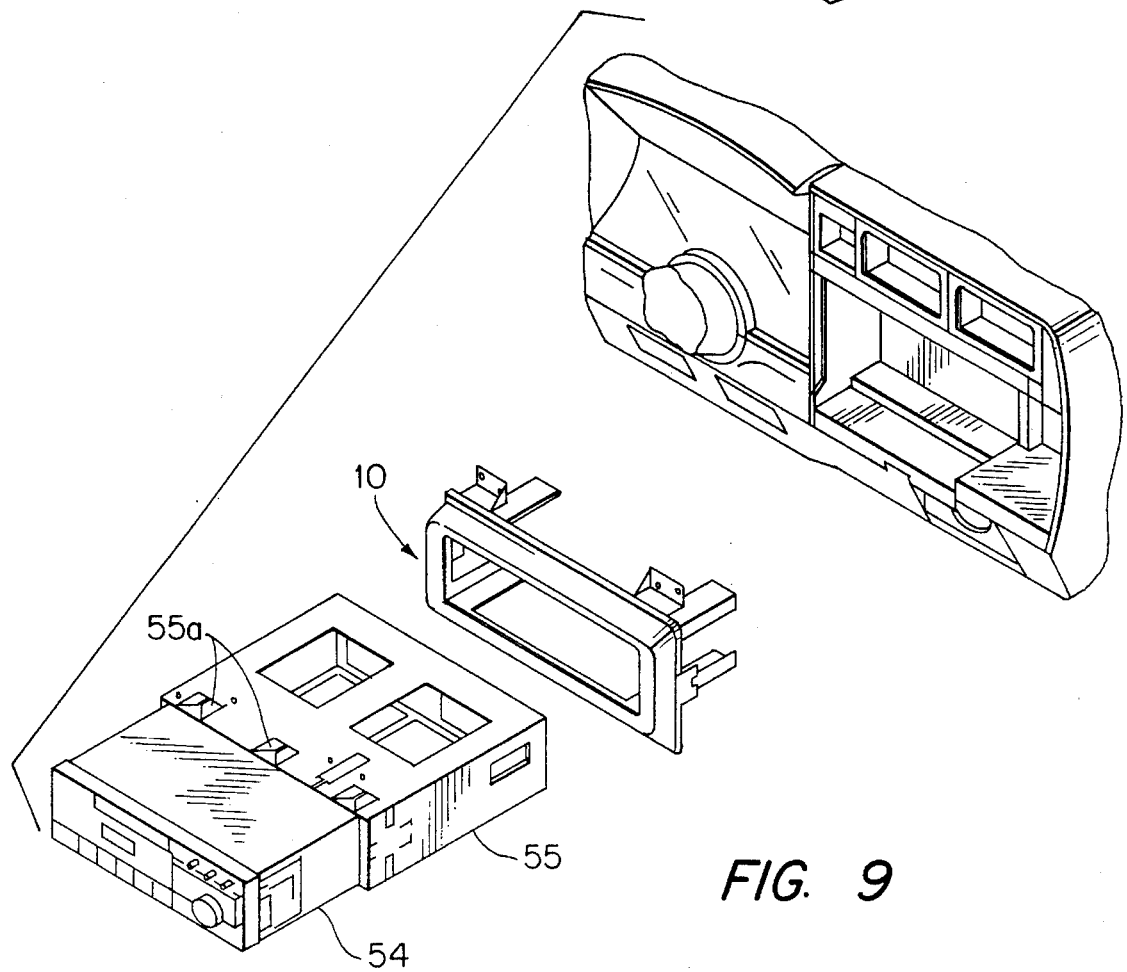
FIG. 9 is a perspective view of the installation kit of the present invention installing a DIN radio with a DIN cage in a vehicle dashboard.

Installation of a DIN radio with a DIN cage will be described with reference to FIG. 9. As shown in FIG. 9, the cage 55 for the DIN radio 54 is first inserted into the housing 10 and tabs 55a are bent backwards to secure the cage 55 to the housing 10. Then, the radio unit 54 is inserted into the cage until it is secure. Then the housing including the DIN radio and cage is secured to the dash in the same manner as the ISO-DIN radio and the two-shaft radio discussed above.

With the above arrangement, a single mounting kit can be used for a particular make and model of car, regardless of the type of audio unit to be installed. Different housing designs may be necessary for the various dashboard support configurations of the many makes and models of vehicles, but the design of the side brackets, shaft supports and trim rings need not be changed. This feature minimizes the manufacturing cost of the kit. Preferably, the housing 10, mounting brackets 24, trim ring 30 and shaft supports 40 are made of a plastic material in an injection molding process. However, those of skill in this field readily understand that alternative materials and methods may be used, for example, stamped and metal parts, composites, etc.

Thus, what has been described is an installation kit which is easy to manufacture, easy to install, and provides a safe and secure mounting for the radio within the vehicle dashboard. While the present invention has been described with respect to what is presently believed to be the most practical and preferred embodiment, it is to be understood that the invention is not limited thereto. For example, the mounting flanges could be adjustable to account for variations in the design of the dashboard supports, which may vary from vehicle to vehicle. Specifically, the invention is intended to cover various modifications and equivalent structures and functions. Such equivalent structures are well known to those of skill in the field and need not be described in further detail.

I claim:

1. A mounting kit for mounting to a support in a vehicle one of a plurality of types of components, said kit comprising:

a component housing for housing a component, said housing including a main body having an aperture through which the component protrudes, means for securing said housing to the vehicle support, and a plurality of legs defining a space within which the component is housed;

at least one shaft support with a shaft aperture therein, said shaft support attachable to said housing at a position where said shaft aperture will receive a control shaft of the component; and at least one side bracket attachable adjacent a pair of said legs for securing the component to said housing.

2. A mounting kit according to claim 1, wherein said plurality of legs are L-shaped in cross-section and each of said plurality of legs corresponds to one side corner of the component.

3. A mounting kit according to claim 1, wherein said housing comprises an integral piece of plastic.

4. A mounting kit according to claim 1, wherein when the component comprises a unit of a DIN type including a main unit and a DIN cage, each of said plurality of legs contacts one side corner of the DIN cage and the main unit is slidably secured in the DIN cage.

5. A mounting kit according to claim 1, wherein when the component comprises a unit with at least one control shaft, said at least one shaft support attaches to said main body of said housing within the periphery of the aperture of said housing.

6. A mounting kit according to claim 5, wherein said at least one shaft support includes a detent for snapping onto the periphery of the aperture of said main body of said housing.

7. A mounting kit according to claim 5, wherein the unit is secured to said shaft support and said housing with a shaft nut screwed onto a threaded portion of the at least one control shaft.

8. A mounting kit according to claim 5, wherein said housing and said at least one shaft support each comprise an integral piece of plastic.

9. A mounting kit according to claim 1, wherein when the component does not include a DIN cage or at least one control shaft, said at least one bracket is attached to a pair of said plurality of legs.

10. A mounting kit according to claim 9, wherein said at least one bracket includes a plurality of through-holes for aligning with standard screw holes in a side of the component, wherein in use at least one screw passes through one of said through-holes in said at least one bracket and engages a corresponding screw hole in the component, so as to secure the component to said at least one bracket.

11. A mounting kit according to claim 9, wherein said at least one bracket includes at least one recess into which one of said plurality of legs is snapped.

12. A mounting kit according to claim 11, wherein said at least one bracket is secured to the one of said plurality of legs with a screw.

13. A mounting kit according to claim 9, wherein said at least one bracket is secured to at least one of said plurality of legs with a screw.

14. A mounting kit according to claim 9, wherein said housing and said at least one bracket each comprise an integral piece of plastic.

15. A mounting kit for mounting a component to a support in a vehicle, said kit comprising:

a component housing for housing the component, said housing including a main body having an aperture through which the component protrudes, securing means for securing said housing to the vehicle support, and a plurality of legs defining a space, within which the component is housed; and at least one side bracket, attachable to said housing, for securing the component to said housing, wherein said at least one side bracket is secured to at least one of said plurality of legs, and wherein each leg is L-shaped in cross-section and positioned so as to correspond to a side corner of the component.

16. A mounting kit according to claim 15, wherein said at least one side bracket includes a plurality of through-holes for aligning with standard screw holes in a side of the component, wherein in use at least one screw passes through one of said through-holes in said at least one side bracket and engages a corresponding screw hole in the component so as to secure the component to said at least one side bracket.

17. A mounting kit according to claim 15, wherein said at least one side bracket is secured to at least one of said plurality of legs with a screw.

18. A mounting kit according to claim 15, wherein said housing and said at least one side bracket each comprise an integral piece of plastic.

19. A mounting kit according to claim 15, further comprising a trim ring for mounting to an inner periphery of the aperture of said main body of said housing to support an external periphery of a front face of the component.

20. A mounting kit for mounting a component to a support in a vehicle, said kit comprising:

a component housing for housing a component, said housing including a main body having an aperture through which the component protrudes, securing means for securing said housing to the vehicle support, and a plurality of legs defining a space, within which the component is housed; and at least one side bracket, attachable to said housing, for securing the component to said housing, wherein said at least one side bracket is secured to at least one of said plurality of legs; and wherein said at least one side bracket includes at least one recess into which one of said plurality of legs is snapped.

21. A mounting kit according to claim 20, wherein said at least one side bracket is secured to the one of said plurality of legs with a screw.

22. A mounting kit according to claim 20, wherein said at least one side bracket includes a plurality of through-holes for aligning with standard screw holes in a side of the component, wherein in use at least one screw passes through one of said through-holes in said at least one side bracket and engages a corresponding screw hole in the component, so as to secure the component to said at least one side bracket.

23. A mounting kit according to claim 20, wherein said housing and said at least one side bracket each comprise an integral piece of plastic.

24. A mounting kit according to claim 20, further comprising a trim ring for mounting to an inner periphery of the aperture of said main body of said housing to support an external periphery of a front face of the component.

25. A mounting kit for mounting to a support in a vehicle a component having at least one control shaft, said kit comprising:

a component housing for housing the component, said housing including a main body having an aperture through which the component protrudes, means for securing said housing to the vehicle support, and a plurality of legs defining a space, within which the component is housed, wherein said plurality of legs are L-shaped in cross-section and each of said plurality of legs corresponds to one side corner of the component; and at least one shaft support having a shaft aperture for supporting the at least one control shaft of the component, wherein said at least one shaft support attaches to the periphery of the aperture of said main body of said housing.

26. A mounting kit according to claim 25, wherein said at least one shaft support includes a detent for snapping onto the periphery of the aperture of said main body of said housing.

27. A mounting kit according to claim 25, wherein the component is secured to said shaft support and said housing with a shaft nut screwed onto a threaded portion of the at least one control shaft.

28. A mounting kit according to claim 25, wherein said housing and said at least one shaft support each comprise an integral piece of plastic.

* * * * *